United States Patent
Han et al.

(10) Patent No.: US 8,888,355 B2
(45) Date of Patent: Nov. 18, 2014

(54) LIGHT GUIDE PLATE, AND APPARATUS AND METHOD FOR MANUFACTURING THE SAME

(71) Applicant: LG Display Co., Ltd., Seoul (KR)

(72) Inventors: YoungBae Han, Gumi-si (KR); SunHye Kang, Gwangju (KR)

(73) Assignee: LG Display Co., Ltd., Seoul (KR)

( * ) Notice: Subject to any disclaimer, the term of this patent is extended or adjusted under 35 U.S.C. 154(b) by 212 days.

(21) Appl. No.: 13/720,664

(22) Filed: Dec. 19, 2012

(65) Prior Publication Data
US 2014/0092605 A1   Apr. 3, 2014

(30) Foreign Application Priority Data
Sep. 28, 2012 (KR) .......................... 10-2012-0108596

(51) Int. Cl.
*F21V 8/00* (2006.01)

(52) U.S. Cl.
CPC .................................... *G02B 6/0065* (2013.01)
USPC .......... 362/615; 362/317; 156/345.19; 216/24

(58) Field of Classification Search
USPC .......... 362/615, 623, 317; 156/345.19; 216/24
See application file for complete search history.

(56) References Cited

U.S. PATENT DOCUMENTS

| 7,736,043 | B2 | 6/2010 | Parker |
| 2005/0007757 | A1* | 1/2005 | Leu et al. .......................... 362/31 |
| 2010/0134999 | A1 | 6/2010 | Huang et al. |

FOREIGN PATENT DOCUMENTS

| DE | 10101926 A1 | 10/2001 |
| DE | 69802774 T2 | 8/2002 |
| KR | 20-0282979 Y1 | 7/2002 |
| WO | WO 2006/074791 A1 | 7/2006 |

* cited by examiner

*Primary Examiner* — David V Bruce
(74) *Attorney, Agent, or Firm* — Birch, Stewart, Kolasch & Birch, LLP

(57) ABSTRACT

Discussed are a light guide plate and an apparatus and method for manufacturing the same. The light guide plate manufacturing apparatus includes a stage supporting a substrate for manufacturing the light guide plate, a screen disposed on the substrate supported by the stage, an applying part applying an etching ink onto the screen, and a squeegee pressurizing the screen with the etching ink applied thereon to form a pattern corresponding to a screen pattern in the substrate. The screen pattern corresponding to the pattern to be formed in the substrate is formed in the screen. The etching ink is used for etching the substrate to form the pattern in the substrate. The light guide plate can prevent loss of light due to the pattern, and enhance efficiency of light (emitted from a light source) supplied to a display panel.

11 Claims, 7 Drawing Sheets

LIGHT GUIDE PLATE, AND APPARATUS AND METHOD FOR MANUFACTURING THE SAME

CROSS-REFERENCE TO RELATED APPLICATIONS

This application claims the benefit of the Korean Patent Application No. 10-2012-0108596 filed on Sep. 28, 2012, which is hereby incorporated by reference as if fully set forth herein.

BACKGROUND

1. Field of the Invention

The present invention relates to a light guide plate used for display devices, and an apparatus and method for manufacturing the same.

2. Discussion of the Related Art

Recently, flat panel display devices that can decrease a weight and a volume corresponding to the limitations of cathode ray tubes (CRTs) are being developed. Liquid crystal display (LCD) devices, plasma display panels (PDPs), field emission display (FED) devices, and light emitting display devices are actively being researched as flat type display devices. However, among such flat panel display devices, LCD devices are easily manufactured, have good drivability of drivers, realize a high-quality image, and thus are attracting much attention.

Since LCD devices are driven with a low operating voltage, the LCD devices have low power consumption and are used as portable devices. Accordingly, the LCD devices are widely applied to various fields such as notebook computers, monitors, spacecrafts, airplanes, etc.

LCD devices include a liquid crystal panel that includes a lower substrate, an upper substrate, and a liquid crystal layer formed between the lower substrate and the upper substrate. In the LCD devices, the alignment of liquid crystal in the liquid crystal layer is adjusted with an electric field, and thus, light transmittance of the liquid crystal layer is adjusted, thereby displaying an image.

Unlike the other flat panel display devices, the LCD devices non-emitting display devices, and thus, a backlight unit is disposed as a light source in the rear of the liquid crystal panel. The backlight unit is largely categorized into a direct-type backlight unit and an edge-type backlight unit.

In the direct-type backlight unit, the light source is disposed in the rear of the liquid crystal panel, and light emitted from the light source is directly transferred to the liquid crystal panel. In the edge-type backlight unit, the light source is disposed in one side of the rear of the liquid crystal panel, and light emitted from the light source is transferred to the liquid crystal panel through the light guide plate.

The light guide plate changes a light path such that light emitted from a light source disposed at one side is transferred to the liquid crystal panel disposed in the front of the light guide plate. To this end, a plurality of patterns that changes a refractive angle of light to transfer light to the front of the light guide plate is disposed at a bottom of the light guide plate.

FIG. 1 is a sectional view illustrating a backlight unit including a light guide plate manufactured by a related art manufacturing method.

As illustrated in FIG. 1, the backlight unit includes a light guide plate 10 and at least one light emitting diode (LED) 20.

The LED 20 acts as the light source of the backlight unit.

The light guide plate 10 is disposed in order for one side surface thereof to face the LED 20. The light guide plate 10 changes a light path such that light emitted from the LED 20 is supplied to a liquid crystal panel (not shown).

A plurality of patterns 11 are formed at a lower side surface of the light guide plate 10. The patterns 11 are formed in the light guide plate 10 by a printing process or an imprinting process. The printing process forms the patterns 11 by printing a printing ink on the light guide plate 10 along a pattern. The imprinting process forms the patterns 11 by duplicating resin on the light guide plate 10 along a pattern.

In the light guide plate 10 manufactured by the related art manufacturing method, residual materials are left in respective portions in which the patterns 11 are formed. When the light guide plate 10 is manufactured by a screen printing process, printing inks are left in the light guide plate 10, thereby forming the patterns 11. When the light guide plate 10 is manufactured by the imprinting process, resins are left in the light guide plate 10, thereby forming the patterns 11. The printing inks or resins left in the light guide plate 10 partially absorb light emitted from the LED 20, causing the loss of light emitted from the LED 20. For this reason, the light guide plate 10 manufactured by the related art manufacturing method has a limitation in that efficiency of light (emitted from the LED 20) supplied to the liquid crystal panel is reduced. Furthermore, the light guide plate 10 manufactured by the related art manufacturing method decreases the light efficiency of the backlight unit, and thus degrades quality of an image displayed by a display device.

SUMMARY

Accordingly, the present invention is directed to a light guide plate used for display devices and an apparatus and method for manufacturing the same that substantially obviate one or more problems due to limitations and disadvantages of the related art.

An aspect of the present invention is directed to a light guide plate and an apparatus and method for manufacturing the same, which can prevent the loss of light due to a pattern formed in the light guide plate.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an apparatus for manufacturing a light guide plate which includes: a stage supporting a substrate for manufacturing the light guide plate; a screen disposed on the substrate supported by the stage, a screen pattern corresponding to a pattern to be formed in the substrate being formed in the screen; an applying part applying an etching ink, which is used for etching the substrate to form the pattern in the substrate, onto the screen; and a squeegee pressurizing the screen with the etching ink applied thereon to form the pattern corresponding to the screen pattern in the substrate.

In another aspect of the present invention, there is provided a method of manufacturing a light guide plate which includes: loading a substrate, which is used for manufacturing the light guide plate, onto a stage to be disposed between the stage and a screen; applying an etching ink, which is used for forming a pattern in the substrate, onto the screen; pressurizing the screen with the etching ink applied thereon to etch the substrate along a screen pattern formed in the screen; and vaporizing, when the substrate has been etched, the etching ink that has etched the substrate.

In another aspect of the present invention, there is provided a light guide plate which includes: a light incident part receiving light emitted from a light source; a light output part outputting light incident through the light incident part to a display panel; and a bottom part formed on the reverse of the light output part, wherein a pattern, which is etched by an etching ink and transfers light incident through the light incident part to the light output part, is formed at the bottom part.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of a light guide plate manufacturing apparatus according to the present invention will be described in detail with reference to the accompanying drawings.

Figure 1:
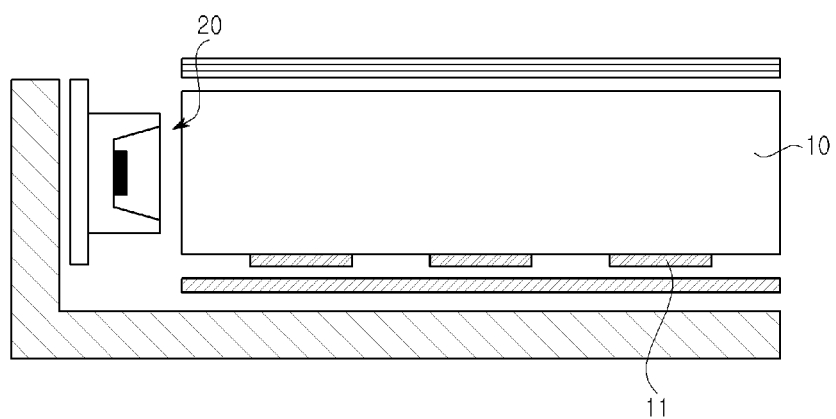
FIG. 1 is a sectional view illustrating a backlight unit including a related art light guide plate.
Figure 2:
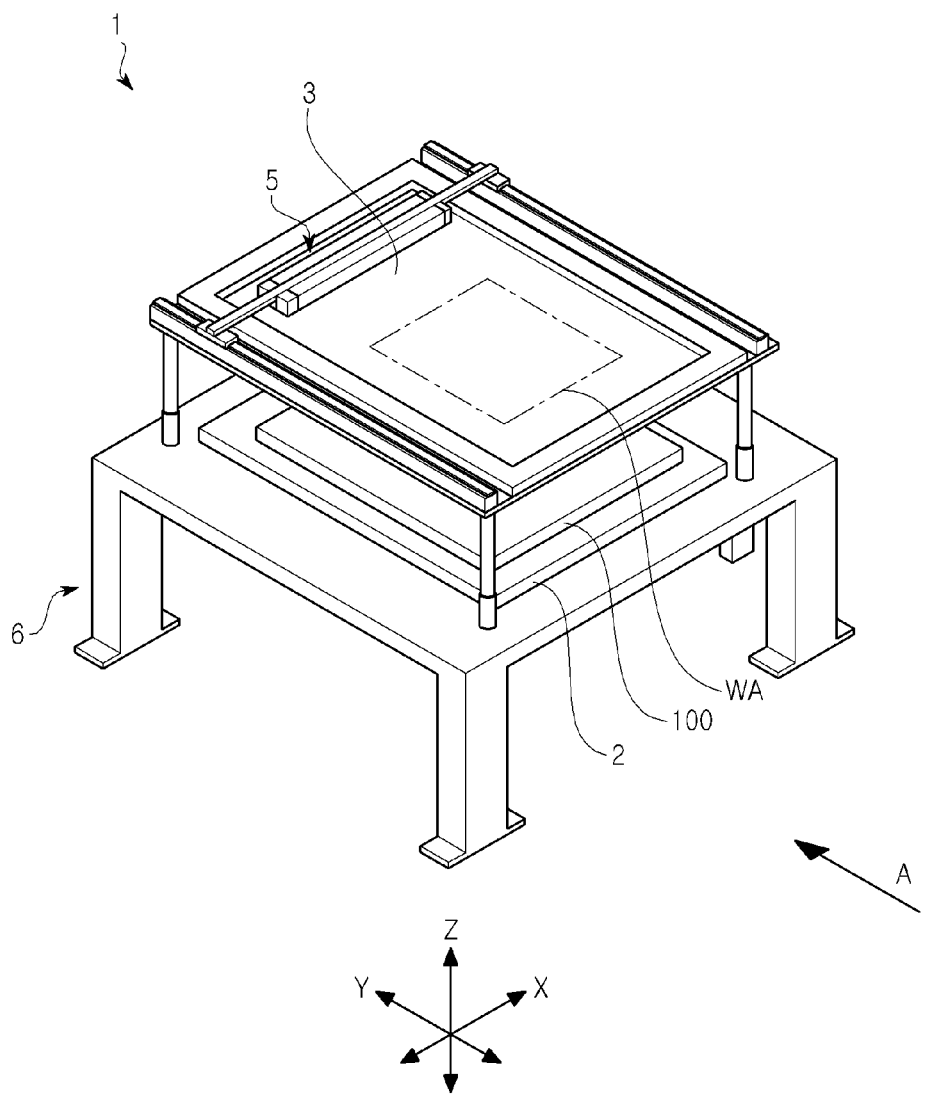
FIG. 2 is a perspective view schematically illustrating an apparatus for manufacturing a light guide plate according to an embodiment of the present invention.
Figure 3:
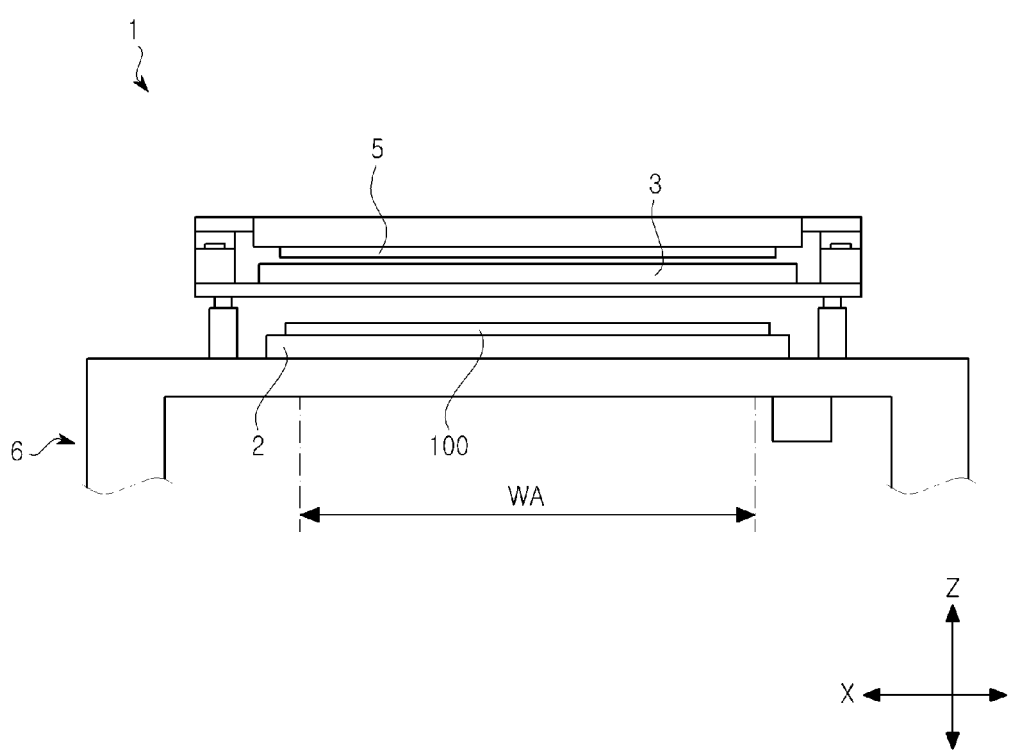
FIG. 3 is a side view schematically illustrating a shape of the light guide plate manufacturing apparatus as seen in an A direction of FIG. 2.
Figure 4:
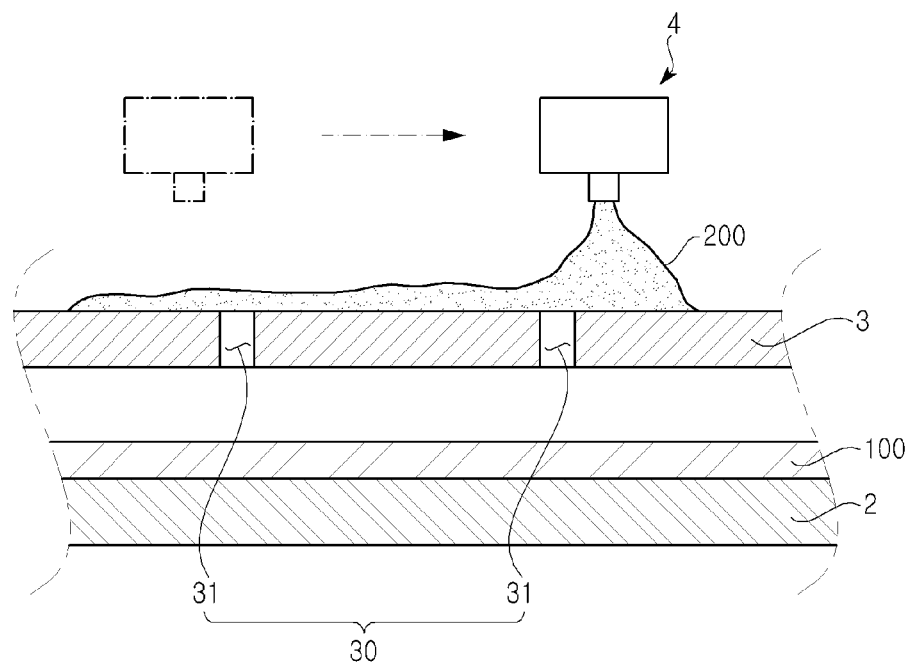
FIG. 4 is a view illustrating that an applying part according to an embodiment of the present invention applies an etching ink onto a screen

Referring to FIGS. 2 to 4, a light guide plate manufacturing apparatus 1 according to an embodiment of the present invention includes a stage 2 for supporting a substrate 100, a screen 3 that is disposed on the substrate 100 supported by the stage 2, an applying part 4 (see FIG. 4) that applies an etching ink 200 (see FIG. 4) for forming a pattern in the substrate 100, and a squeegee 5 for pressurizing the screen with the etching ink 200 applied thereon. The substrate 100 is for manufacturing a light guide plate used for a display device. The etching ink 200 may include an etching material that corrodes and etches the substrate 100. For example, the etching material may be a nitric acid solution or a hydrochloric acid solution. The screen 3 includes a screen pattern 40 (see FIG. 4) that is formed in a shape corresponding to a pattern to be formed in the substrate 100.

When the applying part 4 applies the etching ink 200 onto the screen 3, the squeegee 5 pressurizes the screen 3 such that the etching ink 200 applied onto the screen 3 passes through the screen 3 and contacts the substrate 100. The etching ink 200 applied onto the screen 3 passes through the screen 3 via a screen pattern 30 and contacts the substrate 100. In this case, the etching ink 200 applied onto the screen 3 passes through the screen 3 along the shape of the screen pattern 30, and contacts the substrate 100 in a shape corresponding to the screen pattern 30. Therefore, the light guide plate manufacturing apparatus 1 according to an embodiment of the present invention may bring the etching ink 200 into contact with only a portion corresponding to a pattern to be formed in the substrate 100. Accordingly, the light guide plate manufacturing apparatus 1 corrodes and removes only a portion of the substrate 100 contacting the etching ink 200, thereby manufacturing a light guide plate with the pattern formed therein. The light guide plate manufacturing apparatus 1 can obtain the following effects.

In the related art, since a light guide plate is manufactured by a printing process or an imprinting process, a pattern formed of a printing ink or resin is formed in the light guide plate. In the manufactured light guide plate, the pattern formed of the printing ink or resin partially absorbs light emitted from a light source, causing the loss of light.

On the other hand, the light guide plate manufacturing apparatus 1 according to an embodiment of the present invention etches a portion of the substrate 100 along a pattern by using the etching ink 200, thereby manufacturing a light guide plate with the pattern formed therein. Consequently, in the light guide plate manufacturing apparatus 1, the substrate 100 itself forms a pattern, and therefore, the pattern formed in the light guide plate absorbs light, thus preventing the loss of light. Accordingly, the light guide plate manufacturing apparatus 1 can enhance the efficiency of light (emitted from the light source) supplied to a display panel. Furthermore, the light guide plate manufacturing apparatus 1 enhances the light efficiency of a backlight unit, thus enhancing the quality of an image displayed by a display device.

Hereinafter, the stage 2, the screen 3, the applying part 4, and the squeegee will be described in detail with reference to the accompanying drawings.

Referring to FIGS. 2 to 5, the stage 2 supports the substrate 100. The stage 2 is disposed on the reverse of the squeegee 5 with respect to the screen 3. That is, the stage 2 may be disposed under the screen 3. The stage 2 may be overall formed in a tetragonal plate shape, but is not limited thereto. As another example, the stage 2 may be formed in the other shape (which is capable of supporting the substrate 100) such as a discal shape or the like. The stage 2 may be formed to have a size greater than that of the substrate 100.

The substrate 100 forms an outer shape of the light guide plate. The substrate 100 may have a tetragonal shape having a certain thickness. However, the shape of the substrate 100 is not limited to the tetragonal shape. The substrate 100 may use poly methyl methacrylate (PMMA). PMMA has excellent transmissive characteristic, and thus may be suitably used as the material of the light guide plate. However, the substrate 100 is not limited to only PMMA.

The substrate 100 is loaded onto the stage 2 by a separate transfer means (not shown). When an etching operation for the substrate 100 is completed, the transfer means (not shown) unloads the substrate 100, supported by the stage 2, from the stage 2 and then transfers the substrate 100 to a device that performs a subsequent process for the substrate 100. An operation that loads the substrate 100 onto the stage 2 and an operation that unloads the substrate 100 from the stage 2 may be performed by a worker.

Referring to FIGS. 2 to 7, the screen 3 is disposed on the stage 2. The substrate 100 may be loaded on the stage 2 to be disposed between the screen 3 and the stage 2.

The screen 3 includes the screen pattern 30 that is formed in a shape corresponding to a pattern to be formed in the substrate 100. The screen pattern 30 may be formed to pass through the screen 3. Therefore, the etching ink 200 may pass through the screen 3 via the screen pattern 30 and contact the substrate 100 disposed under the screen 3. Since the screen pattern 30 is formed in a shape corresponding to a pattern to be formed in the substrate 100, the screen 3 may pass the etching ink 200 such that the etching ink 200 contacts only a portion corresponding to the pattern in the substrate 100. Therefore, the screen 3 allows only a portion corresponding to the pattern to be corroded and etched by the etching ink 200 in the substrate 100, thereby enabling an intaglio pattern to be formed in the substrate 100.

The screen 3 is formed of fabric, and thus, the screen pattern 30 may be formed in a mesh shape. In this case, due to the screen 3, there is a limitation in forming a fine pattern. For this reason, the light guide plate manufacturing apparatus 1 may use the screen 3 formed of a metal material so as to enable a finer pattern to be formed in the substrate 100. In this case, in the screen 3, a plurality of pattern holes 31 are formed in a metal board in a shape corresponding to a pattern to be formed in the substrate 100, thereby implementing the screen pattern 30. The light guide plate manufacturing apparatus 1 uses the screen 3 that enables the size of each of the pattern holes 31 to be more reduced and moreover enables an interval between adjacent pattern holes 31 to be more reduced, and thus, a finer pattern may be formed in the substrate 100. For example, the light guide plate manufacturing apparatus 1 uses the screen 3 in which the pattern holes 31 are formed in the metal board, and thus, a fine pattern of about 30 μm may be formed in the substrate 100.

The screen 3 may be formed of metal having a lower degree of corrosion (caused by the etching ink 200) than the substrate 100. That is, the screen 3 may be formed of metal that is not corroded by the etching ink 200. The screen 3 may be formed of aluminum (Al) or stainless steel. In this case, the etching ink 200 may be formed of a material that corrodes the substrate 100 without corroding the screen 3. The stage 2 may be overall formed in a tetragonal plate shape, but is not limited thereto. As another example, the stage 2 may be formed in the other shape (enabling a pattern to be formed in the substrate 100) such as a discal shape or the like. The stage 2 may be formed to have a size greater than that of the substrate 100.

Referring again to FIGS. 2 to 4, the applying part 4 is disposed on the screen 3. The applying part 4 applies the etching ink 200 onto the screen 3. The applying part 4 equally applies the etching ink 200 onto the screen while moving.

The applying part 4 applies the etching ink 200 onto the screen 3 in a first axis direction (X-axis direction) of the screen 3 while moving in the first axis direction (X-axis direction). Also, the applying part 4 applies the etching ink 200 onto the screen 3 in a second axis direction (Y-axis direction) of the screen 3 while moving in the second axis direction (Y-axis direction) vertical to the first axis direction (X-axis direction).

The applying part 4 applies the etching ink 200 onto the screen 3 while moving along the first axis direction (X-axis direction) and the second axis direction (Y-axis direction), and thus, a portion corresponding to a work area WA in the screen 3 is overall coated with the etching ink 200.

The etching ink 200 etches the substrate 100 to form a pattern 110 in the substrate 100. The etching ink 200 may include an etching material that corrodes and etches the substrate 100. The etching material may be a nitric acid solution or a hydrochloric acid solution. In addition to the nitric acid solution or the hydrochloric acid solution, a material for corroding and etching the substrate 100 may be included in the etching material. The etching material may be diluted for adjusting a degree of corrosion of the substrate 100.

When the etching ink 200 includes only the etching material, since the etching material is low in viscosity, the etching material passes through the screen 3 via the screen pattern 30, and then, with the etching material contacting the substrate 100, the etching material is around spread without maintaining a shape corresponding to a pattern. For this reason, when the etching ink 200 including only the etching material is used, it is difficult to manufacture a light guide plate in which the pattern 110 is formed in the substrate 100.

To solve this limitation, the etching ink 200 may include a viscosity adjustment material for adjusting the viscosity of the etching material. The viscosity adjustment material may be carboxymethyl cellulode. In addition to carboxymethyl cellulode, all materials capable of increasing the viscosity of the etching material may be included in the viscosity adjustment material.

By increasing the viscosity of the etching ink 200, the etching ink 200 that passes through the screen 3 via the screen pattern 30 and contacts the substrate 100 can maintain the shape of the screen pattern 30.

The etching ink 200 may have viscosity of 1300 cps to 2500 cps. When the viscosity of the etching ink 200 is less than 1300 cps, the etching ink 200 has viscosity that is not sufficient to maintain a shape corresponding to a pattern when the etching ink 200 has passed through the screen 3 and contacted the substrate 100. For this reason, it is difficult to manufacture a light guide plate in which a desired pattern is formed. When the viscosity of the etching ink 200 is greater than 2500 cps, as viscosity increases, the etching ink 200 can fill the screen pattern 30 through a repetitive work. Therefore, a cleaning period for the screen 3 is shortened, and thus, the operating cost can increase. Also, when the viscosity of the etching ink 200 is greater than 2500 cps, excessive power and time can be expended in passing through the screen 3 via the screen pattern 30. Accordingly, since the squeegee 5 is driven to pressurize the screen 3 with considerable power, the process cost increases, and moreover, as the moving speed of the squeegee 5 becomes slower for pressurizing the screen 3, a time taken in forming a pattern in a light guide plate increases.

When an etching ink is defined as 100 parts by weight, carboxymethyl cellulode may be added into the etching ink by 3 to 5 parts by weight. In this way, when carboxymethyl cellulode is added, the etching ink is adjusted in viscosity to have viscosity of 1300 cps to 2500 cps. Especially, when an etching ink is defined as 100 parts by weight, carboxymethyl cellulode may be added into the etching ink by 5 parts by weight. In this way, when carboxymethyl cellulode is added, the etching ink has viscosity of 1500 cps.

Figure 5:
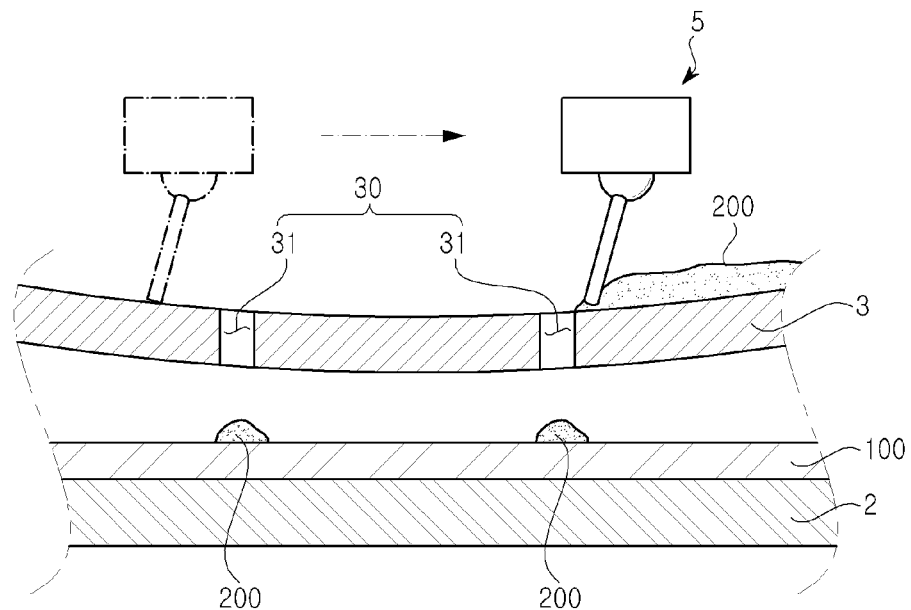
FIG. 5 is a view illustrating that a squeegee according to an embodiment of the present invention allows an etching ink to flow to a substrate by pressurizing a screen.
Figure 6:
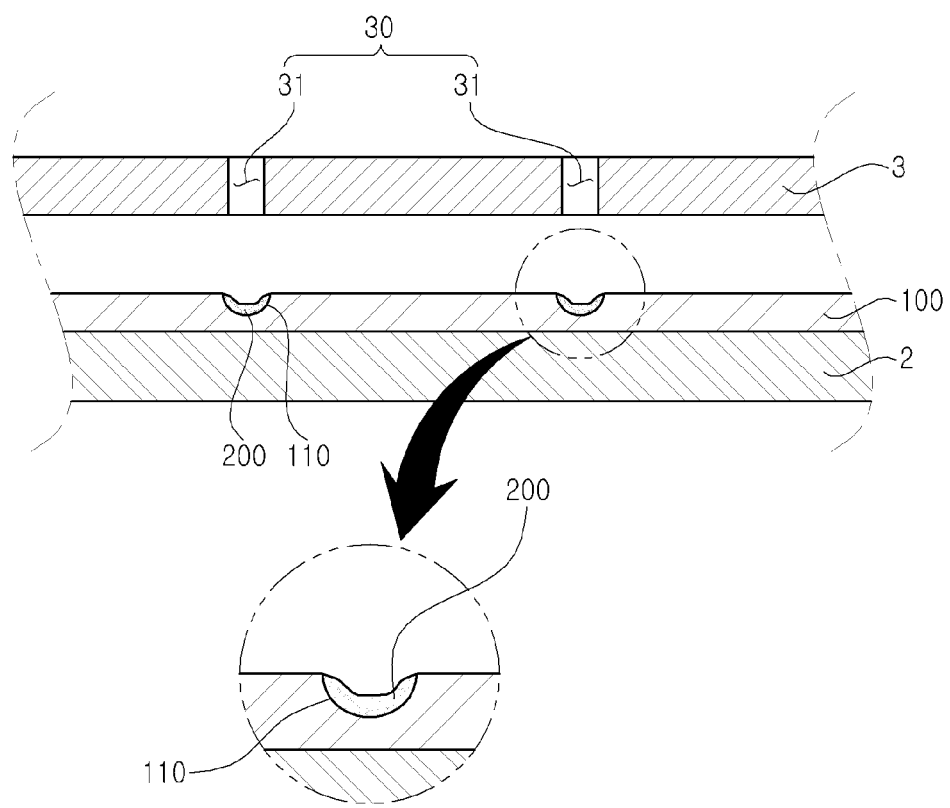
FIG. 6 is a view illustrating that an etching ink according to an embodiment of the present invention corrodes the substrate to form a pattern.
Figure 7:
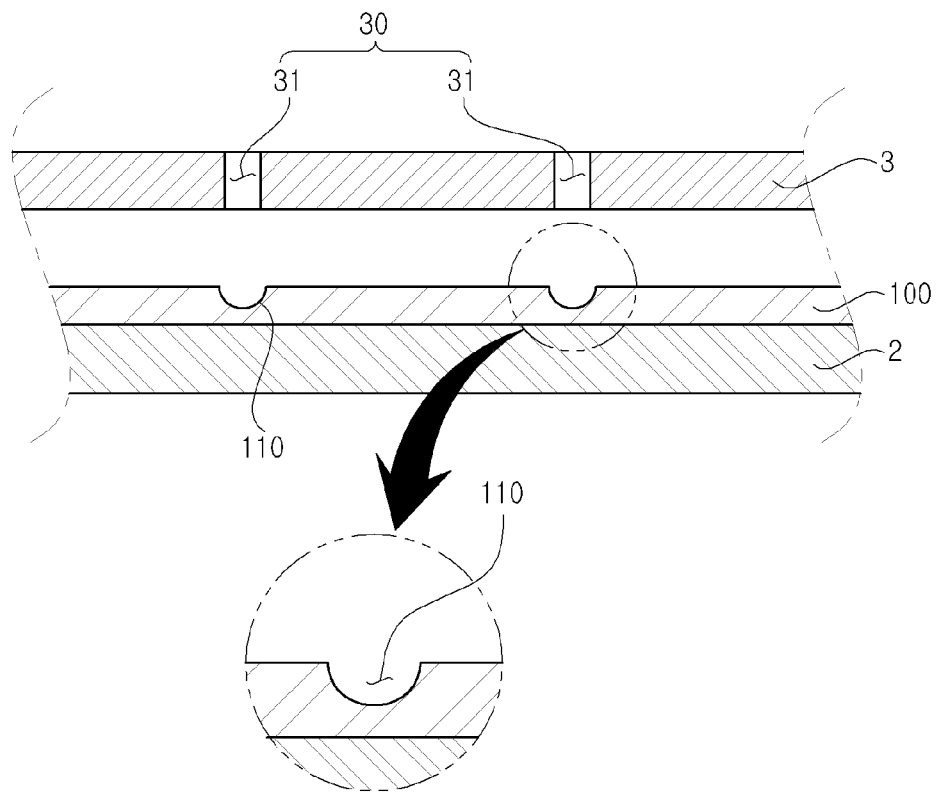
FIG. 7 is a view illustrating that the etching ink according to an embodiment of the present invention forms the pattern on the substrate and then is vaporized.
Figure 8:
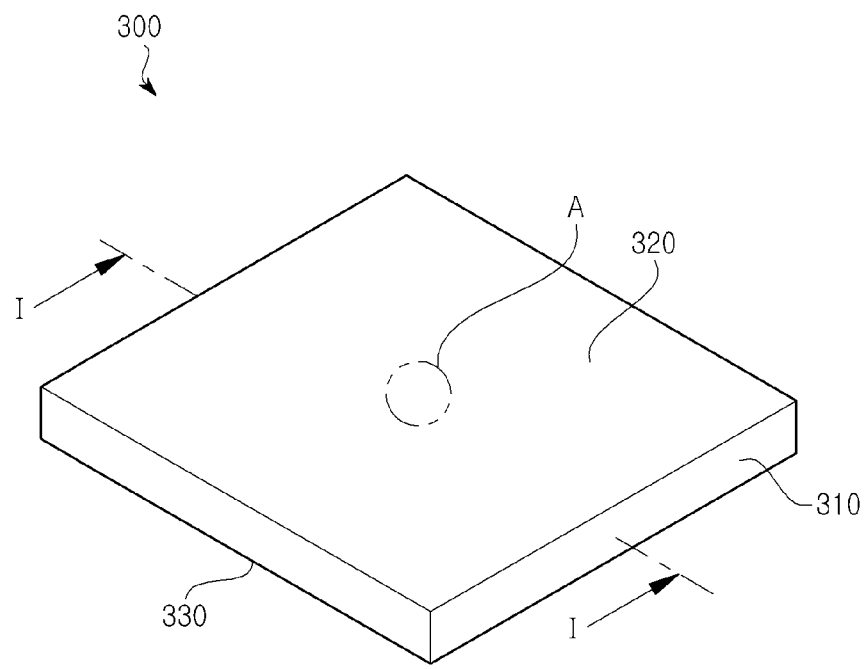
FIG. 8 is a perspective view schematically illustrating a light guide plate according to an embodiment of the present invention.
Figure 9:
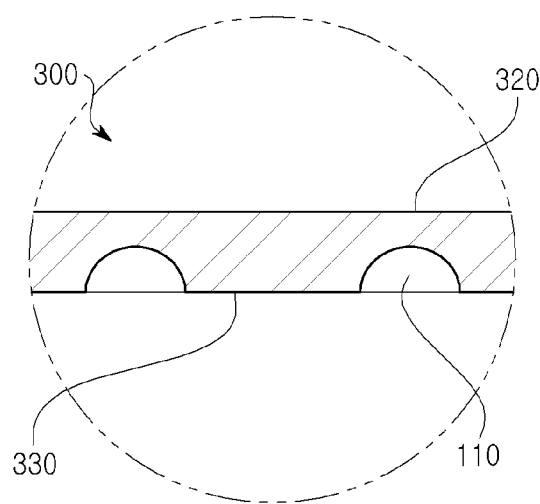
FIG. 9 is a sectional view schematically illustrating an enlarged view of an A portion of FIG. 8.

Referring to FIGS. 2, 3 and 5, the squeegee 5 is disposed on the screen 3. With the squeegee 5 contacting the screen 3, the squeegee 5 moves, thereby enabling the etching ink 200 applied onto the screen 3 to pass through the pattern holes 31 and to be applied onto the substrate 100.

The squeegee 4 may be formed to have a length corresponding to the length of the work area WA in the first axis direction (X-axis direction). Therefore, with the squeegee 5 contacting the screen 3, the squeegee 5 moves in the second direction (Y-axis direction) vertical to the first axis direction (X-axis direction), and thus pressurizes a portion corresponding to the entire work area WA in the screen 3, thereby enabling the etching ink 200 to pass through the pattern holes 31 and to be applied onto the substrate 100.

Referring again to FIGS. 2 and 3, the stage 2 and screen 3 are disposed in a body 6.

Hereinafter, embodiments of a light guide plate manufacturing method according to the present invention will be described in detail with reference to the accompanying drawings.

Referring to FIGS. 2 to 7, the light guide plate manufacturing method according to the present invention is for manufacturing a light guide plate in which a certain pattern is formed. The light guide plate manufacturing method according to the present invention may be performed using the above-described light guide plate manufacturing apparatus 1 according to the present invention. The light guide plate manufacturing method according to the present invention may have the following configuration.

First, the substrate 100 is loaded onto the stage 2. Such a process may be performed by the transfer means (not shown) loading the substrate 100 onto the stage 2. Alternatively, the process that loads the substrate 100 onto the stage 2 may be performed by a worker loading the substrate 100 onto the stage 2.

Subsequently, the etching ink 200 is applied onto the screen 3. Such a process may be performed by the applying part 4 applying the etching ink 200 onto the screen 3. The applying part 4 may apply the etching ink 200 onto the screen 3 while moving in the first axis direction (X-axis direction).

Subsequently, the substrate 100 is etched along the screen pattern 30 formed in the screen 3. Such a process may be performed by the squeegee 4 pressurizing the screen 3 with the etching ink 3 applied thereon. The etching ink 3 applied onto the screen 3 passes through the screen 3 along the shape of the screen pattern 30, and thus contacts the substrate 100 in a shape corresponding to the screen pattern 30. Therefore, the light guide plate manufacturing method according to the present invention may bring the etching ink 200 into contact with only a portion corresponding to a pattern to be formed in the substrate 100. Accordingly, the light guide plate manufacturing method according to the present invention corrodes and removes only a portion of the substrate 100 contacting the etching ink 200, thereby manufacturing a light guide plate with the pattern formed therein. Thus, in the light guide plate manufacturing method according to the present invention, the pattern formed in the light guide plate absorbs light to thereby prevent the loss of light, thus enhancing the efficiency of light (emitted from the light source) supplied to a display panel. Furthermore, the light guide plate manufacturing method according to the present invention enhances the light efficiency of a backlight unit, thus enabling the manufacturing of a light guide plate that enhances the quality of an image displayed by a display device.

Subsequently, the etching ink 200 is vaporized. Such a process may be performed by vaporizing the etching ink 200 left in the substrate 100 after the substrate 100 is etched by the etching ink 200. The process of vaporizing the etching ink 200 may be performed by exposing the substrate 100, in which a pattern has been formed by the etching ink 200, at a normal temperature for a certain time. The process of vaporizing the etching ink 200 may be performed by cooling the substrate 100 in which a pattern has been formed by the etching ink 200.

Here, a process that applies the etching ink 200 onto the screen 3 may be performed by applying the etching ink 200, including an etching material for etching the substrate 100, onto the screen 3. The etching ink 200 may include an etching material that corrodes and etches the substrate 100. The etching material may be a nitric acid solution or a hydrochloric acid solution. When the etching material has a higher degree of corrosion than the substrate 100, a material other than the etching material may be used.

When the process that applies the etching ink 200 onto the screen 3 is performed using only the etching material, since the etching material is low in viscosity, the etching material passes through the screen 3 via the screen pattern 30, and then, with the etching material contacting the substrate 100, the etching material is around spread without maintaining a shape corresponding to a pattern. For this reason, when a process that forms a pattern in the substrate 100 is performed using only the etching material, it is difficult to manufacture a light guide plate in which a desired pattern is formed.

To solve this problem, the process that applies the etching ink 200 onto the screen 3 may be performed by applying the etching ink 200, including the etching material and a viscosity adjustment material for adjusting the viscosity of the etching material, onto the screen 3. The viscosity adjustment material includes a material for increasing the viscosity of the etching material. The viscosity adjustment material may be carboxymethyl cellulode. The viscosity adjustment material may use all materials capable of increasing the viscosity of the etching material. By increasing the viscosity of the etching ink 200, the light guide plate manufacturing method according to the present invention enables the maintenance of a shape corresponding to a pattern when the etching ink 200 has passed through the screen 3 and contacted the substrate 100. Accordingly, the light guide plate manufacturing method according to the present invention enhances the accuracy of an operation for forming a desired pattern in a light guide plate, thus enhancing the quality of the light guide plate.

The process that applies the etching ink 200 onto the screen 3 may be performed by applying the etching ink 200, having viscosity of 1300 cps to 2500 cps, onto the screen 3. When the viscosity of the etching ink 200 is less than 1300 cps, the etching ink 200 has viscosity that is not sufficient to maintain a shape corresponding to a pattern when the etching ink 200 has passed through the screen 3 and contacted the substrate 100. For this reason, it is difficult to manufacture a light guide plate in which a desired pattern is formed. When the viscosity of the etching ink 200 is greater than 2500 cps, as viscosity increases, the etching ink 200 can fill the screen pattern 30 through a repetitive work. Therefore, a cleaning period for the screen 3 is shortened, and thus, the operating cost can increase. Also, when the viscosity of the etching ink 200 is greater than 2500 cps, excessive power and time can be expended in passing through the screen 3 via the screen pattern 30. Accordingly, since the squeegee 5 is driven to pressurize the screen 3 with considerable power, the process cost increases, and moreover, as the moving speed of the squeegee 5 becomes slower for pressurizing the screen 3, a time taken in forming a pattern in a light guide plate increases.

The light guide plate manufacturing method according to the present invention applies the etching ink 200 onto the screen 3 may be performed by applying the etching ink 200, having viscosity of 1300 cps to 2500 cps, onto the screen 3, thus enabling the maintenance of a shape corresponding to a pattern when the etching ink 200 has passed through the screen 3 and contacted the substrate 100 and moreover enabling the etching ink 200 to smoothly pass through the screen 3 via the screen pattern 30. Accordingly, the light guide plate manufacturing method according to the present invention enhances the accuracy of an operation for forming a desired pattern in a light guide plate, thus enhancing the quality of the light guide plate. Also, the light guide plate manufacturing method according to the present invention shortens a time taken in forming a pattern in a light guide plate, thus increasing the productivity of a light guide plate with a pattern formed therein.

When the etching ink 200 is defined as 100 parts by weight, the process that applies the etching ink 200 onto the screen 3 may be performed by applying the etching ink 200, in which the viscosity adjustment material has been added into the etching material by 3 to 15 parts by weight, onto the screen 3. By adding the viscosity adjustment material into the etching material by 3 to 15 parts by weight, the etching ink 200 having viscosity of 1300 cps to 2500 cps may be manufactured. When a nitric acid solution or a hydrochloric acid solution is used as the etching material and carboxymethyl cellulode is used as the viscosity adjustment material, the etching ink 200 may be manufactured to have viscosity of 1500 cps. Accordingly, the light guide plate manufacturing method according to the present invention enhances the accuracy of an operation for forming a desired pattern in a light guide plate, thus enhancing the quality of the light guide plate. Also, the light guide plate manufacturing method according to the present invention shortens a time taken in forming a pattern in a light guide plate, thus increasing the productivity of a light guide plate with a pattern formed therein.

Hereinafter, embodiments of a light guide plate according to the present invention will be described in detail with reference to the accompanying drawings.

Referring to FIGS. 6 to 9, a light guide plate 300 according to the present invention is disposed in a backlight unit and supplies light, emitted from a light source, to a display panel. The light guide plate 300 according to the present invention may be manufactured by forming the pattern 110 in the substrate 100 (see FIG. 7) with the etching ink 200 (see FIG. 6).

The light guide plate 300 according to the present invention includes a light incident part 310 that receives light emitted from the light source, a light output part 320 that outputs light, which is incident through the light incident part 310, to the display panel, and a bottom part 330 that is formed on the reverse of the light output part 320.

The light incident part 310 receives light supplied from the light source to the display panel. The light incident part 310 may be one of four side surfaces of the substrate 100. When the light guide plate 300 according to the present invention is disposed in the backlight unit, the light incident part 310 may be disposed toward the light source.

The light output part 320 outputs light, which is incident through the light incident part 310, to the display panel. When the light guide plate 300 according to the present invention is disposed in the backlight unit, the light output part 320 may be disposed toward the display panel.

The bottom part 330 is formed on the reverse of the light output part 320. With respect to FIG. 7, the light output part 320 is a top, and the bottom part 300 is a bottom. When the light guide plate 300 according to the present invention is disposed in the backlight unit, the bottom part 330 may be disposed toward the reverse side of the display panel.

The pattern 110 for transferring light incident through the light incident part 310 to the light output part 320 is formed at the bottom part 330. A portion of the substrate 100 contacting the etching ink 200 is corroded and removed, thereby forming the pattern 110. Accordingly, the light guide plate according to the present invention can have the following effects.

First, the related art light guide plate is formed using an printing ink or resin. Thus, in the related art light guide plate, a pattern formed of the printing ink or resin partially absorbs light emitted from the light source, causing the loss of light.

On the other hand, in the light guide plate 300 according to the present invention, the pattern 110 is formed by etching a portion of the substrate 100 with the etching ink 200. Therefore, in the light guide plate 300 according to the present invention, the substrate 100 itself configures the pattern 110, and thus, the pattern 110 absorbs light to thereby prevent the loss of light. Accordingly, the light guide plate 300 according to the present invention can enhance the efficiency of light (emitted from the light source) supplied to the display panel. Furthermore, the light guide plate 300 according to the present invention enhances the light efficiency of the backlight unit, thus enhancing the quality of an image displayed by the display device.

The pattern 110 may be formed in plurality at the bottom part 330. The pattern 110 may be formed in an intaglio shape at the bottom part 330, but is not limited thereto. As another example, the pattern 110 may be formed in an embossed shape.

As described above, the present invention enables the manufacturing of the light guide plate that can prevent the loss of light due to the pattern, thus enhancing the efficiency of light (emitted from the light source) supplied to the display panel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. In the light guide plate manufacturing apparatus and method according to the present invention, it has been described above that a light guide plate with an intaglio pattern formed therein is formed by etching a portion of a substrate corresponding to a pattern, but a light guide plate with an embossed pattern formed therein may be formed by etching a portion other than a portion of a substrate corresponding to a pattern.

What is claimed is:

1. An apparatus for manufacturing a light guide plate, comprising:
   a stage supporting a substrate for manufacturing the light guide plate;
   a screen disposed on the substrate supported by the stage, a screen pattern corresponding to a pattern to be formed in the substrate being formed in the screen;
   an applying part applying an etching ink, which is used for etching the substrate to form the pattern in the substrate, onto the screen; and
   a squeegee pressurizing the screen with the etching ink applied thereon to form the pattern corresponding to the screen pattern in the substrate.

2. The apparatus of claim 1, wherein the applying part applies the etching ink, having viscosity of 1300 cps to 2500 cps, onto the screen.

3. The apparatus of claim 1, wherein the applying part applies the etching ink, in which carboxymethyle cellulose is added into one of a nitric acid solution and a hydrochloric acid solution, onto the screen.

4. The apparatus of claim 1, wherein,
the applying part applies the etching ink, in which carboxymethyle cellulose is added into one of a nitric acid solution and a hydrochloric acid solution, onto the screen, and
when the etching ink is defined as 100 parts by weight, the applying part applies the etching ink, in which carboxymethyle cellulose is added into one of a nitric acid solution and a hydrochloric acid solution by 3 to 15 parts by weight, onto the screen.

5. The apparatus of claim 1, wherein the etching ink comprises an etching material for etching the substrate and a viscosity adjustment material for adjusting viscosity of the etching material.

6. The apparatus of claim 1, wherein,
the screen is formed of metal having a lower degree of corrosion, caused by the etching ink, than the substrate, and
a plurality of pattern holes for forming the screen pattern are formed in the screen.

7. A method of manufacturing a light guide plate, comprising:
loading a substrate, which is used for manufacturing the light guide plate, onto a stage to be disposed between the stage and a screen;
applying an etching ink, which is used for forming a pattern in the substrate, onto the screen;
pressurizing the screen with the etching ink applied thereon to etch the substrate along a screen pattern formed in the screen; and
vaporizing, when the substrate has been etched, the etching ink that has etched the substrate.

8. The method of claim 7, wherein the applying of an etching ink comprises applying the etching ink, having viscosity of 1300 cps to 2500 cps, onto the screen.

9. The method of claim 7, wherein the applying of an etching ink comprises applying the etching ink, in which carboxymethyle cellulose is added into one of a nitric acid solution and a hydrochloric acid solution, onto the screen.

10. The method of claim 7, wherein the applying of an etching ink comprises applying the etching ink, in which carboxymethyle cellulose is added into one of a nitric acid solution and a hydrochloric acid solution by 3 to 15 parts by weight, onto the screen when the etching ink is defined as 100 parts by weight.

11. A light guide plate, comprising:
a light incident part receiving light emitted from a light source;
a light output part outputting light incident through the light incident part to a display panel; and
a bottom part formed on the reverse of the light output part, wherein a pattern, which is etched by an etching ink and transfers light incident through the light incident part to the light output part, is formed at the bottom part.

* * * * *